United States Patent
Bernhard et al.

(10) Patent No.: US 10,207,435 B2
(45) Date of Patent: Feb. 19, 2019

(54) PRESSURE-DEPENDENT FOAM MOULDING OF POLY(METH)ACRYLIMIDE PARTICLES IN CLOSED MOULDS FOR PRODUCING RIGID FOAM CORES

(71) Applicants: Kay Bernhard, Darmstadt (DE); Ina Liebl, Griesheim (DE); Tim Denk, Grosswallstadt (DE); Florian Becker, Darmstadt (DE); Thomas Richter, Darmstadt (DE)

(72) Inventors: Kay Bernhard, Darmstadt (DE); Ina Liebl, Griesheim (DE); Tim Denk, Grosswallstadt (DE); Florian Becker, Darmstadt (DE); Thomas Richter, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 222 days.

(21) Appl. No.: 15/321,845

(22) PCT Filed: Jun. 25, 2015

(86) PCT No.: PCT/EP2015/064316
§ 371 (c)(1),
(2) Date: Dec. 23, 2016

(87) PCT Pub. No.: WO2015/197734
PCT Pub. Date: Dec. 30, 2015

(65) Prior Publication Data
US 2017/0136665 A1    May 18, 2017

(30) Foreign Application Priority Data
Jun. 27, 2014   (DE) .................. 10 2014 009 338

(51) Int. Cl.
| | | |
|---|---|---|
| *B29C 44/14* | (2006.01) | |
| *B29C 44/34* | (2006.01) | |
| *B29C 44/44* | (2006.01) | |
| *C08J 9/04* | (2006.01) | |
| *C08J 9/232* | (2006.01) | |
| *B32B 5/24* | (2006.01) | |
| *B32B 7/12* | (2006.01) | |
| *B32B 15/04* | (2006.01) | |
| *B32B 15/18* | (2006.01) | |
| *B29K 33/00* | (2006.01) | |
| *B29L 31/30* | (2006.01) | |

(52) U.S. Cl.
CPC ........ *B29C 44/3415* (2013.01); *B29C 44/143* (2013.01); *B29C 44/3461* (2013.01); *B29C 44/445* (2013.01); *B32B 5/245* (2013.01); *B32B 7/12* (2013.01); *B32B 15/046* (2013.01); *B32B 15/18* (2013.01); *C08J 9/04* (2013.01); *C08J 9/232* (2013.01); *B29K 2033/00* (2013.01); *B29K 2033/26* (2013.01); *B29L 2031/30* (2013.01); *B32B 2266/0242* (2013.01); *B32B 2605/08* (2013.01); *B32B 2605/18* (2013.01); *C08J 2205/10* (2013.01); *C08J 2333/24* (2013.01); *C08J 2333/26* (2013.01)

(58) Field of Classification Search
CPC .............. B29C 44/143; B29C 44/3415; B29C 44/3461; B29C 44/445; B29C 44/005; B29C 44/083; B29C 44/1219; B29C 44/3403; B29C 44/3442; B29C 44/348; B29C 44/3492; B29C 44/3496; B29C 44/586
See application file for complete search history.

(56) References Cited

U.S. PATENT DOCUMENTS

| | | |
|---|---|---|
| 5,928,459 A | 7/1999 | Geyer et al. |
| 2014/0309361 A1 | 10/2014 | Buehler et al. |

FOREIGN PATENT DOCUMENTS

| | | |
|---|---|---|
| CN | 101857656 A | 10/2010 |
| DE | 10 2011 085 026 A1 | 4/2013 |
| EP | 0 874 019 A2 | 10/1998 |
| JP | 2005-272665 A | 10/2005 |

OTHER PUBLICATIONS

International Search Report dated Sep. 28, 2015 in PCT/EP2015/064316 filed Jun. 25, 2015.

*Primary Examiner* — Stella K Yi
(74) *Attorney, Agent, or Firm* — Oblon, McClelland, Maier & Neustadt, L.L.P.

(57) ABSTRACT

The invention relates to a process for the production of mold-foamed poly(meth)acrylimide (P(M)I) cores, in particular of polymethacrylimide (PMI) cores, which can be used by way of example in automobile construction or aircraft construction. A feature of this process is that polymer granules or polymer powder preheated under pressure are moreover charged under pressure to a compression mold where they are foamed with depressurization. In particular, a feature of the process is that it optionally uses a preferably two-shell compression mold for the heating and also for the cooling of the granules and, respectively, the rigid foam core formed therefrom.

16 Claims, No Drawings

PRESSURE-DEPENDENT FOAM MOULDING OF POLY(METH)ACRYLIMIDE PARTICLES IN CLOSED MOULDS FOR PRODUCING RIGID FOAM CORES

FIELD OF THE INVENTION

The invention relates to a process for the production of mould-foamed poly(meth)acrylimide (P(M)I) cores, in particular of polymethacrylimide (PMI) cores, which can be used by way of example in automobile construction or aircraft construction. A feature of this process is that polymer granules or polymer powder preheated under pressure are moreover charged under pressure to a compression mould where they are foamed with depressurization. In particular, a feature of the process is that it optionally uses a preferably two-shell compression mould for the heating and also for the cooling of the granules and, respectively, the rigid foam core formed therefrom.

PRIOR ART

DE 27 26 260 describes the production of poly(meth)acrylimide foams (P(M)I foams) which have excellent mechanical properties that are retained at high temperatures. The foams are produced by the casting process, i.e. the monomers and additional substances required are mixed and polymerized in a chamber. In a second step, the polymer is foamed by heating. This process is very complicated and is difficult to automate.

DE 3 630 930 describes another process for the foaming of the abovementioned copolymer sheets made of methacrylic acid and methacrylonitrile. Here, the polymer sheets are foamed with the aid of a microwave field, and this is therefore hereinafter termed the microwave process. A factor that must be taken into account here is that the sheet to be foamed, or at least the surface thereof, must be heated in advance up to or above the softening point of the material. Since under these conditions the material softened by the external heating naturally also begins to foam, it is not possible to control the foaming process solely through the effect of a microwave field: instead, it requires concomitant external control by an ancillary heating system. This means that a microwave field is added to the normal single-stage hot-air process in order to accelerate foaming. However, the microwave process has proved to be too complicated and therefore of no practical relevance and has never been used.

Alongside PMI foams, there are other known foams based on methacrylic acid and acrylonitrile (PI foams) with similar properties. These are described by way of example in CN 100420702C. However, again these foams are produced from sheets.

Alongside these processes which start from an unfoamed polymer sheet, there are also known "in-mould foaming" processes starting from granules. However, in principle these have a number of disadvantages in comparison with the processes described. A non-uniform pore structure is achieved, which exhibits differences between the interior of the original particles and the boundaries between the original particles.

The density of the foam is moreover inhomogeneous because of non-uniform distribution of the particles during the foaming process—as previously described. Other observations that can be made on these products foamed from granules are poorer cohesion at the interfaces that form between the original particles during the foaming process, and resultant poorer mechanical properties in comparison with materials foamed from a semifinished sheet product.

WO 2013/05947 describes an in-mould process in which at least the latter problem has been solved in that, before the particles are charged to the shaping and foaming mould they are coated with an adhesion promoter, e.g. with a polyamide or with a polymethacrylate. Very good adhesion at the grain boundaries is thus achieved. However, this method does not eliminate the non-uniform pore distribution in the final product.

However, there has to date been very little description of in-mould foaming for rigid foams, in particular for P(M)I foams. In contrast, processes of this type have been known for a long time for other foam materials: polyurethane foams are produced from an appropriate reactive liquid, mostly at room temperature. Foams made of PE, PP, polystyrene or polylactic acid (PLA) are produced from granules in an in-mould foaming process.

The German Patent Application file reference 102014209425.9 discloses a process in which P(M)I granules are foamed thermally in a two-shell compression mould with cavities which conform to the shape and which are used for both heating and cooling. This process represents a significant efficiency increase over the prior art. However, since both heating, and therefore foaming, and cooling take place in the same mould the mould is still always occupied for a relatively long time, and there is therefore also still always a relatively long production cycle time. Furthermore, there are still always discernible density gradients in the resultant foam core, resulting from outside-to-inside temperature gradients within the material to be foamed.

OBJECT

In the light of the prior art discussed it was therefore an object of the present invention to provide a novel process which can process P(M)I particles in a simple manner in an in-mould foaming process to give moulded rigid foam cores, with a throughput rate significantly higher than in the prior art.

A particular object of the present invention was to provide a process for the in-mould foaming of P(M)I which leads to final products with very uniform density distribution and narrow pore size distribution.

A particular object was that this process can be carried out with cycle times that are in particular shorter than those of processes of the prior art, and, without any particular downstream operations, itself leads to rigid foam cores with the final geometry.

Other objects not explicitly discussed at this point can be derived from the prior art, the description, the claims or the inventive examples.

ACHIEVEMENT OF OBJECT

When the expression "poly(meth)acrylimide (P(M)I)" is used hereinafter it means polymethacrylimides, polyacrylimides or a mixture thereof. Similar considerations apply to the corresponding monomers such as (meth)acrylimide and (meth)acrylic acid. By way of example, the expression "(meth)acrylic acid" means not only methacrylic acid but also acrylic acid, and also mixtures of these two.

Said objects are achieved by providing a novel process for the production of rigid poly(meth)acrylimide (P(M)I) foam cores. This process comprises the following steps:

a. heating of P(M)I particles to an atmospheric-pressure-foaming temperature $T_1$, where this takes place under a pressure $p_1$ at which a volume increase of the P(M)I particles of at most 10% by volume takes place in 10 min, b. charging of the P(M)I particles to a mould, where the charging takes place at a pressure $p_2$, which is preferably at most 10% smaller than $p_1$, and then closing of the mould, c. depressurization of the space within the mould to a pressure $p_3$ at a temperature $T_2$, where foaming of the particles takes place, d. cooling of the space within the mould to a temperature $T_3$ and e. opening and removal of the rigid foam core.

A particular advantage of the present process is that the foaming can be carried out within a period of at most 2 min, and that the steps a. to e. together can be carried out within a short period of from 5 to 45 min. A further advantage is found in the uniform temperature distribution within the material at the moment of foaming. This leads to a particularly uniform distribution, and size distribution, of the pores in the final product: unlike in foaming processes of the prior art, the final product exhibits no, or only minimal, density gradients. In foaming processes of the prior art the exterior regions generally foam to a greater extent than internal regions.

The temperature $T_1$ is preferably from 150 to 250° C., particularly preferably from 180 to 220° C. Pressure $p_1$ in step a. and pressure $p_2$ in step b. are preferably in each case from 2 to 20 bar. Temperature $T_2$ is preferably set to a value from 150 to 250° C., particularly preferably from 180 to 220° C. The pressure $p_3$ is preferably from 0.1 to 2.0 bar, particularly preferably from atmospheric pressure to 1.5 bar.

In one particular variant of the process of the invention step b. is carried out before step a. In this variant the preheating of the particles takes place in the mould in which foaming also takes place in step c. In this variant the pressure $p_2$ can be selected flexibly, and by way of example it is possible to charge the material at atmospheric pressure. Although this variant does not achieve to any significant extent the great advantage of an accelerated process in comparison with purely thermal foaming without exterior pressure change, it nevertheless achieves a second great advantage of the process of the invention.

When the final product is compared with the product of a purely thermal foaming process, it exhibits significantly better and more uniform pore distribution and pore structure. This can be explained in that when the foaming process of the invention with pressure change is used, the foaming process takes place simultaneously in the entire mould—rather than from outside to inside, as is the case during foaming with heating.

However, in an embodiment of the process of the invention that is preferred over the above-mentioned variant, step a. is carried out before step b., i.e. the heating of the particles takes place outside of the mould. This embodiment allows significant acceleration of the process during mass production, since step a. on the one hand and steps c. to e. on the other hand can be carried out in parallel with one another.

In this variant it is particularly preferable that the particles are held in step a. in a holding vessel at temperature $T_1$ and at the pressure $p_1$ and are thus preheated. The particles are then charged batchwise to the mould in step b., and after the batchwise charging procedure here in each case the connection between holding vessel and mould is closed before the depressurization takes place in step c. It is naturally also possible in the first variant described for the process of the invention that the particles are held in a holding vessel providing, for example, neutral conditions of pressure and of temperature.

In addition or as alternative, suction and/or blowing of the particles into the mould in step b. has proved to be very advantageous and to accelerate the process.

Suction means here that on establishment of a connection between the mould and, for example, a holding vessel the pressure in the mould is smaller than in the holding vessel. It is possible that the mould comprises, in addition, one or more suction apparatuses that can be activated variably.

In the case of blowing, the holding vessel or a corresponding charging apparatus has a nozzle by means of which the particles are blown into the mould. Another option that is entirely possible for the process according to the invention is a combination of blowing and suction.

It is preferable here that the closed mould is positioned vertically before the particles are charged thereto. The material here is then charged through an appropriate aperture on the upper side of the vertically positioned mould in the space within. For the suction process, the mould can then have, on the lower side, a suction apparatus that is activated in step a., e.g. by opening of a valve that otherwise isolates the suction apparatus. The space within the mould can also optionally have a plurality of such suction devices available.

The pressure $p_2$ in step b. here is derived from the pressure in the particle feed system, e.g. in a holding vessel, the pressure in the empty mould, and the pressure changes resulting from suction and/or blowing apparatuses. A necessary feature of the parameters for step b. in the variant where a. is carried out before step b. is that all of these parameters in the invention are set in such a way that $p_2$ is at most 10% below $p_1$. Excessively rapid foaming of particles is thus suppressed. In the embodiment using a blower for charging the particles to the mould according to step b. it is actually entirely possible that $p_2$ is slightly higher than $p_1$. It is moreover entirely possible that the different pressures in the mould and holding vessel, and also the blowing and/or suction process, lead to pressure profiles, pressure distributions or pressure variations during step b. However, it is necessary to achieve compliance with the abovementioned condition of a pressure minimum for $p_2$ for at least 80% of the step, and that, at most, the pressure falls very briefly and does not fall excessively, by more than 10%, below $p_1$.

It is moreover advantageous that in step b. the mould fill level reached when particles are charged to the mould is from 50 to 100%, preferably from 75 to 98%. In this context, 100% fill level means that the particles are charged to the mould until they reach the uppermost edge thereof. Between the particles here there are naturally unoccupied spaces remaining, the size of which depends on the particle size and the particle shape. Said unoccupied spaces can theoretically constitute up to 50% of the space within the mould, even when the fill level is 100%. Said unoccupied spaces are finally closed by the foaming in step c. and a homogeneous rigid foam core is thus formed.

In relation to the mould used in steps b. to e. and also optionally in step a., it is particularly preferable that the mould has, in both shells, a cavity which conforms to the internal shape and which covers the area of the respective space within the mould. In step c. a heating liquid is passed through these cavities, and in step d. a cooling liquid is passed through these cavities.

It is preferable that these cavities conform to the shape on the side counterposed to the space within the mould. It is particularly preferable that the external mould side opposite thereto likewise conforms to the shape. It is further preferable that the thickness of the cavities between said two sides is from 2 to 20 cm, preferably from 5 to 12 cm. It is further preferable that the thickness of the mould parts which conform to the shape of the two sides, between the cavity and the space within the mould, is from 2 to 15 cm, preferably from 4 to 12 cm.

It is equally preferable that the heating liquid and the cooling liquid are the same type of liquid. In particular here, these liquids are passed from two different holding vessels with different temperatures into the cavity. It is preferable that the temperature of the heating liquid is from 180 to 250° C. and that the temperature of the cooling liquid is from 20 to 40° C.

In particular, oils which do not comprise low-boiling fractions and which resist temperatures up to at least 300° C. are suitable as heating liquid and, respectively, cooling liquid. An example of a suitable oil is SilOil P20.275.50 from Huber.

Before step b., the space within the mould can be equipped with what are known as inserts. These are first surrounded by the granules charged in step b., and are thus entirely or to some extent enclosed by the foam matrix within the subsequent rigid foam core as integral constituent of this workpiece. These inserts can by way of example be items with an internal screw thread. Said internal screw thread can be used subsequently to form screw-thread connections to the rigid foam cores. Analogously it is also possible to incorporate pins, hooks, tubes or the like. During the production of the rigid foam core it is also possible to integrate electronic chips or cables into said core.

In one particular embodiment, these inserts are tubes, blocks or other placeholders which have been coated and shaped in such a way that they can easily be removed from the foam matrix after the removal of the foamed rigid foam core in step e. It is thus possible by way of example to produce cavities, recesses or holes in the rigid foam core.

In the invention there are various preferred embodiments of the P(M)I particles used in step a.

In a first embodiment, the P(M)I particles are ground material derived from a P(M)I sheet polymer obtained in the form of cast polymer. Said sheets can by way of example be comminuted in a mill to give suitable particles. It is preferable in this variant to use ground P(M)I particles of size from 1.0 to 4.0 mm.

In one preferred variant of the invention, said P(M)I particles are prefoamed before these are charged to the mould in step a. Care has to be taken here that the prefoaming is not carried out to completion, but instead is carried out only until the degree of foaming is from 10 to 90%, preferably from 20 to 80%. The final complete foaming then takes place in step c. This variant preferably uses prefoamed P(M)I particles of size from 1.0 to 25.0 mm. It is preferable that the density of these prefoamed P(M)I particles is from 40 to 400 kg/m$^3$, preferably from 50 to 300 kg/m$^3$, particularly preferably from 60 to 220 kg/m$^3$ and with particular preference from 80 to 220 kg/m$^3$. A particularly suitable prefoaming process is defined by way of example in the German Patent Application with application file reference 102013225132.7.

In a third embodiment of the process, the P(M)I particles are P(M)I suspension polymers. It is preferable to use suspension polymers of this type with a size from 0.1 to 1.5 mm, particularly preferably from 0.1 to 1.0 mm. The production of P(M)I suspension polymers can by way of example be found in the international application with file reference PCT/EP2014/050658.

In a fourth embodiment of the process of the invention, prefoamed P(M)I suspension polymers are used as initial charge in step a. In relation to the degree of foaming, the statements above relating to the prefoamed particles of a ground material again apply. It is preferable that the density of these prefoamed P(M)I particles is from 40 to 400 kg/m$^3$, preferably from 50 to 300 kg/m$^3$, particularly preferably from 60 to 220 kg/m$^3$ and with particular preference from 80 to 220 kg/m$^3$. These prefoamed suspension polymers are preferably used with a particle size of from 0.1 to 2.0 mm, particularly from 0.2 to 1.5 mm.

In the process of the invention it is optionally possible that during the first half, preferably during the first quarter, of the process time of step c. hot air, a hot gas or steam, preferably a hot inert gas or air, is passed into the space within the mould. The introduction temperature is from 90 to 300° C., preferably from 150 to 250° C. However, there is no fundamental requirement for this type of procedure, since the foaming of the preheated particles is achieved by means of pressurization, and this then makes additional introduction of energy unnecessary.

In comparison with the prior art, it is possible by means of the process of the invention to produce mouldings or foam materials with a markedly more homogeneous pore structure, and without defects, and at the same time in more complex shapes. This process moreover permits rapid production of these complex shapes with low cycle times and with particularly good quality. In particular, when the process of the invention is compared with prior-art processes it has shorter heating and cooling cycles. Another great advantage of the present process in comparison with the prior art is that it is sufficiently non-aggressive to prevent damage to the surface of the P(M)I particles.

In one particular embodiment of the process of the invention it is possible before step b. to equip the internal sides of the mould shells with prepregs or organopanels. Said prepregs or organopanels can optionally have been coated with an adhesive or with an adhesion promoter. During the foaming in step c., the foam that is formed then bonds to the coated or uncoated prepregs or organopanels, which thus form outer layers. When this type of procedure is used, the rigid foam core removed in step e. takes the form of a composite material with outer layers.

It is moreover possible to use adhesion promoters to improve adhesion between foam core material and outer layers, where said adhesion is significant in subsequent steps for the production of composite materials. Said adhesion promoters can also have been applied on the surface of the P(M)I particles before the prefoaming process of the invention begins, this being an alternative to application in a subsequent step. In particular, polyamides or poly(meth)acrylates have proved to be suitable as adhesion promoters. However, it is also possible to use low-molecular-weight compounds which are known to the person skilled in the art from the production of composite materials, in particular as required by the matrix material used for the outer layer.

In particular, the process of the invention has the great advantage that it can be carried out very rapidly and therefore in combination with downstream processes with very low cycle times. The process of the invention can therefore be integrated very successfully within a mass production system.

The process parameters to be selected for the entire process of the invention depend on the design of the system used in any individual case, and also on the materials used. They can easily be determined by the person skilled in the art with use of a little preliminary experimentation.

The material used according to the invention is P(M)I, in particular PMI. These P(M)I foams are also termed rigid foams, and feature particular robustness. The P(M)I foams are normally produced in a two-stage process: a) production of a cast polymer, and b) foaming of said cast polymer. In accordance with the prior art, these are then cut or sawn to give the desired shape. An alternative which has not so far become widely accepted in industry is the in-mould foaming process mentioned, and the process of the invention can be used for this.

Production of the P(M)I begins with production of monomer mixtures which comprise (meth)acrylic acid and (meth)acrylonitrile, preferably in a molar ratio of from 2:3 to 3:2 as main constituents. Other comonomers can also be used, examples being esters of acrylic or methacrylic acid, styrene, maleic acid and itaconic acid and anhydrides thereof, and vinylpyrrolidone. However, the proportion of the comonomers here should not be more than 30% by weight. Small quantities of crosslinking monomers can also be used, an example being allyl acrylate. However, the quantities should preferably be at most from 0.05% by weight to 2.0% by weight.

The copolymerization mixture moreover comprises blowing agents which at temperatures of about 150 to 250° C. either decompose or vaporize and thus form a gas phase. The polymerization takes place below this temperature, and the cast polymer therefore comprises a latent blowing agent. The polymerization advantageously takes place in a block mould between two glass plates.

The production of semifinished PMI products of this type is known in principle to the person skilled in the art and can be found by way of example in EP 1 444 293, EP 1 678 244 or WO 2011/138060. Semifinished PMI products that may in particular be mentioned are those marketed in foamed form with the trademark ROHACELL® by Evonik Industries AG. Semifinished acrylimide products (semifinished PI products) can be considered to be analogous to the PMI foams in relation to production and processing. However, semifinished acrylimide products are markedly less preferred than other foam materials for reasons of toxicology.

In a second variant of the process of the invention, the P(M)I particles are suspension polymers which can be introduced directly per se into the process. The production of suspension polymers of this type can be found by way of example in DE 18 17 156 or in the German Patent Application with Application file reference 13155413.1.

A particular feature of the rigid P(M)I foam cores produced according to the invention is that the shape of the rigid foam core is complex, and that a skin of thickness preferably at least 100 µm composed of P(M)I encloses the surface of the rigid foam core to an extent of at least 95%. These novel rigid foam cores therefore have no open pores on the surface and, in contrast to the materials of the prior art, have particular stability, e.g. in relation to shock or impact, even without any additional outer layer. These materials are novel per se, i.e. irrespective of the process of the invention, and are therefore equally provided by the present invention.

It is preferable that the density of these novel rigid P(M)I foam cores is from 25 to 220 kg/m$^3$. These products moreover have optionally been provided with the inserts described above.

The foamed rigid foam cores produced according to the invention, made of P(M)I, can by way of example be further processed to give foam core composite materials. Said foam mouldings or foam core composite materials can in particular be used in mass production by way of example for bodywork construction or for interior cladding in the automobile industry, interior parts in rail vehicle construction or shipbuilding, in the aerospace industry, in mechanical engineering, in the production of sports equipment, in furniture construction or in the design of wind turbines. The rigid foam cores of the invention are generally suitable in principle for any type of lightweight construction.

The invention claimed is:

1. A process for the production of a rigid poly(meth)acrylimide foam core, the process comprising:
    heating poly(meth)acrylimide particles to an atmospheric-pressure-foaming temperature $T_1$ under a pressure $p_1$ wherein a volume of the poly(meth)acrylimide particles increases by at most 10% by volume in 10 min,
    charging the poly(meth)acrylimide particles to a mould and closing the mould, wherein the charging takes place at a pressure $p_2$,
    depressurizing a space within the mould to a pressure $p_3$ at a temperature $T_2$ and foaming the particles,
    cooling the space within the mould to a temperature $T_3$ thereby obtaining a rigid poly(meth)acrylimide foam core,
    opening the mould and removing the rigid poly(meth)acrylimide foam core.

2. The process according to claim 1, wherein the poly(meth)acrylimide particles are prefoamed poly(meth)acrylimide particles of size from 1.0 to 25.0 mm.

3. The process according to claim 1, wherein the poly(meth)acrylimide particles are poly(meth)acrylimide suspension polymers of size from 0.1 to 1.0 mm.

4. The process according to claim 1, wherein the foaming is performed within a time period of at most 2 min, and
    wherein the process including the heating, the charging and closing, the depressurizing and foaming, and the opening and removing together are performed within a time period of from 5 to 45 min.

5. The process according to claim 1, wherein the charging of poly(meth)acrylimide particles to the mould and closing the mould is performed before the heating of polym(meth)acrylimide particles to an atmospheric-pressure-foaming temperature $T_1$.

6. The process according to claim 1, wherein the heating, the charging and closing, the depressurizing and foaming, and the opening and removing together are performed in sequence, and
    wherein the pressure $p_2$ is at most 10% smaller than $p_1$.

7. The process according to claim 1, wherein the temperature $T_1$ is from 150 to 250° C., and wherein the pressure $p_1$ and the pressure $p_2$ are from 2 to 20 bar.

8. The process according to claim 1, wherein the temperature $T_2$ is from 150 to 250° C., and wherein the pressure $p_3$ is from 0.1 to 2.0 bar.

9. The process according to claim 1, wherein the temperature $T_2$ is from 180 to 220° C., and wherein the pressure $p_3$ is from atmospheric pressure to 1.5 bar.

10. The process according to claim 1, wherein during the charging the poly(meth)acrylimide particles are sucked into the mould, blown into the mould, or both.

11. The process according to claim 1, wherein a mould fill level reached during the charging of the poly(meth)acrylimide particles to the mould is from 50 to 100%.

12. The process according to claim 1, wherein the particles are held during the heating of poly(meth)acrylimide particles in a holding vessel at temperature $T_1$ and at the pressure $p_1$,
    the charging of poly(meth)acrylimide particles to the mould is performed in a batchwise manner, and after the charging a connection between the holding vessel and the mould is closed before the depressurizing of the space within the mould to a pressure $p_3$ is performed.

13. The process according to claim 1, wherein the mould comprises at least two shells and each shell comprises a cavity of thickness from 2 to 20 cm which conforms to an internal shape of the mould and which covers an area of the space within the mould in a manner such that each cavity conforms to a shape of the space within the mould,
wherein a heating liquid is optionally passed through each cavity during the depressurizing of the space within the mould to a pressure $p_3$, and
wherein a cooling liquid is passed through each cavity during the cooling of the space within the mould to a temperature $T_3$.

14. The process according to claim 13, wherein
the heating liquid and the cooling liquid are both oils which do not comprise low-boiling fractions and which resist temperature up to at least 300° C., and
the heating liquid and the cooling liquid are passed from two different holding vessels with different temperatures into each cavity, in a manner such that the temperature of the heating liquid is from 180 to 250° C. and the temperature of the cooling liquid is from 20 to 40° C.

15. The process according to claim 13, further comprising
equipping an internal side of each mould shell with prepregs or organopanels prior to the charging of the poly(meth)acrylimide particles to the mould, and
wherein the rigid poly(meth)acrylimide foam core is in the form of a composite material comprising outer layers.

16. The process according to claim 13, wherein the heating liquid is passed through each cavity during the depressurizing of the space within the mould to a pressure $p_3$.

* * * * *